UNITED STATES PATENT OFFICE.

NATHAN WOOD, OF PORTLAND, MAINE.

IMPROVEMENT IN CHEWING-GUMS.

Specification forming part of Letters Patent No. 134,022, dated December 17, 1872.

*To all whom it may concern:*

Be it known that I, NATHAN WOOD, of Portland, in the county of Cumberland and State of Maine, have invented a new and useful Improved Chewing-Gum; and I hereby declare the following to be such a full, clear, and exact description of the same as will enable others skilled in the art to which it appertains to manufacture the same.

I am aware that compounds and natural gums have been prepared for chewing, but I have found that these are open to the objections of being either quite costly, deleterious to the health, or of having no agreeable aroma or flavor.

The compound which I have invented, and is herein described, has a very agreeable flavor, which may be varied to suit the taste, and is elastic and very agreeable in the mouth, and, as a consequence of its elasticity, not hurtful to the teeth, and also possesses very wholesome and healthy properties from the nature of the ingredients of which it is composed.

As a base of my compound, or a vehicle for the aromatic and other properties of the different ingredients, I use the natural gum, called in commerce "chickly," or gum chickly, and is a quite hard and brittle gum, varying according to the purity of the sample from a light to a dark brown color. It yields very readily to heat, being softened easily by holding in the mouth, and when warm is very ductile and adhesive, but without any perceptible odor or taste, and is entirely free from any injurious qualities, and is the product of a tree which grows in Mexico and perhaps in some other tropical countries.

This gum I first take and refine and purify by any of the common and well-known methods usually practiced for refining and purifying vegetable-gums, resins, or balsams; and when thus purified I add the gum of the spruce or other vegetable aromatic gum or resin in about the proportion of one part of the aromatic gum or resin to two parts of the chickly. These I combine and work together, by the use of heat, in any convenient manner, until the whole mass becomes completely homogeneous, and then allowing this product to become cool, when it may be divided into proper sizes for use and packed for market. Among the large number of vegetable gums and resins which may be used in this compound, for their aromatic qualities, I have found the gum or resin known as "tolu" to be peculiarly valuable in this compound, both from its very agreeable aromatic flavor as well as for its expectorant and demulcent properties.

When the gum chickly is compounded, as herein described, with the aromatic gum, the product is in every respect a chewing-gum superior to any heretofore made. The chickly supplies all the needed mechanical properties of durability, elasticity, and ductility, while in the great variety of valuable aromatic and medicinal qualities found among the vegetable gums and resins almost any desired flavor or medicinal effect may be produced or exhibited.

I will here remark that, as I design to use in this compound only the vegetable gums and resins all the various manipulations herein indicated, such as purifying and mixing, may be proceeded with in any of the various ways employed by persons skilled in pharmacy, for that purpose, and well known in that art.

What I claim as my invention, and desire to secure by Letters Patent, is—

As a new article of manufacture, the compound herein described, composed substantially of the ingredients, in the manner and for the purposes, as herein set forth.

NATHAN WOOD.

Witnesses:
   D. W. SCRIBNER,
   F. E. JORDAN.